(12) United States Patent
Nelson et al.

(10) Patent No.: US 11,396,923 B2
(45) Date of Patent: Jul. 26, 2022

(54) CENTRIFUGAL PENDULUM ABSORBER WITH RADIAL TRAVEL STOP

(71) Applicant: Schaeffler Technologies AG & Co. KG, Herzogenaurach (DE)

(72) Inventors: Kyle Nelson, Wadsworth, OH (US); Jonathan Adams, Pittsburgh, PA (US); Jose Maria Cristiani, Cholula (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 164 days.

(21) Appl. No.: 17/020,901

(22) Filed: Sep. 15, 2020

(65) Prior Publication Data

US 2022/0082152 A1  Mar. 17, 2022

(51) Int. Cl.
*F16F 15/14* (2006.01)

(52) U.S. Cl.
CPC ...... *F16F 15/145* (2013.01); *F16F 2226/041* (2013.01)

(58) Field of Classification Search
CPC .... F16F 15/12353; F16F 15/14; F16F 15/145; F16F 2226/041; F16H 2045/0226; F16H 2045/0263
USPC ...................................................... 74/574.2
See application file for complete search history.

(56) References Cited

U.S. PATENT DOCUMENTS

| | | | | |
|---|---|---|---|---|
| 2013/0283967 A1* | 10/2013 | Movlazada | ......... | F16F 15/1214 74/574.2 |
| 2015/0204416 A1* | 7/2015 | Schnaedelbach | ..... | F16F 15/145 74/574.2 |
| 2015/0369334 A1* | 12/2015 | Dinger | ................. | F16F 15/145 74/574.2 |
| 2016/0153521 A1* | 6/2016 | Tondellier | ............. | F16F 15/145 74/574.2 |
| 2016/0160958 A1* | 6/2016 | Hennebelle | ........... | F16F 15/145 74/574.2 |
| 2016/0160959 A1* | 6/2016 | Takikawa | .............. | F16F 15/145 74/574.2 |
| 2016/0208876 A1* | 7/2016 | Movlazada | ............... | F16D 3/12 |
| 2016/0348753 A1* | 12/2016 | Verhoog | .............. | F16F 15/145 |
| 2019/0063549 A1* | 2/2019 | Tomita | ................ | F16F 15/1204 |

(Continued)

FOREIGN PATENT DOCUMENTS

| | | | | |
|---|---|---|---|---|
| DE | 102018201095 A1 | * | 7/2019 | ............. F16F 15/14 |
| FR | 2986296 | * | 8/2013 | ............. F16F 15/14 |

(Continued)

*Primary Examiner* — Vinh Luong

(74) *Attorney, Agent, or Firm* — Volpe Koenig

(57) ABSTRACT

A centrifugal pendulum absorber, including: a first pendulum mass; a second pendulum mass; a center plate axially located between the first pendulum mass and the second pendulum mass, connected to the first pendulum mass and the second pendulum mass, and arranged to receive rotational torque; a first resilient bumper axially located between the first pendulum mass and the second pendulum mass, and connected to the first pendulum mass and the second pendulum mass; and a first radial travel stop connected to the first pendulum mass or to the second pendulum mass, located radially outward of the first resilient bumper, radially aligned with at least a portion of the first resilient bumper, and free of contact with the first resilient bumper when the centrifugal pendulum absorber is at rest.

20 Claims, 13 Drawing Sheets

(56) References Cited

U.S. PATENT DOCUMENTS

2020/0088264 A1* 3/2020 Nakamura ............ B62D 25/088
2021/0062891 A1* 3/2021 Malley .................. F16F 15/145

FOREIGN PATENT DOCUMENTS

| WO | WO 2011120485 A1 * | 10/2011 | .............. F16F 15/14 |
| WO | WO 2017025091 A1 * | 2/2017 | .............. F16F 15/14 |

* cited by examiner

CENTRIFUGAL PENDULUM ABSORBER WITH RADIAL TRAVEL STOP

TECHNICAL FIELD

The present disclosure relates to a centrifugal pendulum absorber with a radial travel stop to prevent damage to a resilient bumper.

BACKGROUND

A known centrifugal pendulum absorber includes resilient bumpers to soften contact between pendulum masses as the masses displace in reaction to rotation of the absorber. High rotational speeds of the absorber cause destructive deflection of and strain on the resilient bumpers.

SUMMARY

According to aspects illustrated herein, there is provided a centrifugal pendulum absorber, including: a first pendulum mass; a second pendulum mass; a center plate axially located between the first pendulum mass and the second pendulum mass, connected to the first pendulum mass and the second pendulum mass, and arranged to receive rotational torque; a first resilient bumper axially located between the first pendulum mass and the second pendulum mass, and connected to the first pendulum mass and the second pendulum mass; and a first radial travel stop connected to the first pendulum mass or to the second pendulum mass, located radially outward of the first resilient bumper, radially aligned with at least a portion of the first resilient bumper, and free of contact with the first resilient bumper when the centrifugal pendulum absorber is at rest.

According to aspects illustrated herein, there is provided a centrifugal pendulum absorber, including: a center plate arranged to receive rotational torque and including a first plurality of openings, a plurality of pairs of pendulum masses, each pair of pendulum masses including a first pendulum mass and a second pendulum mass axially bracketing the center plate, the first pendulum mass including a second plurality of openings, and the second pendulum mass including a third plurality of openings; a plurality of rollers located in the first plurality of openings, the second plurality of openings, and the third plurality of openings, and enabling relative displacement between the plurality of pairs of pendulum masses and the center plate in a first circumferential direction and in a radial direction; a plurality of resilient bumpers; and a plurality of radial travel stops connected to the plurality of pairs of pendulum masses. For each pair of pendulum masses: a first resilient bumper, included in the plurality of resilient bumpers, is connected to the first pendulum mass and to the second pendulum mass and extends past the first pendulum mass in the first circumferential direction; a second resilient bumper, included in the plurality of resilient bumpers, is connected to the first pendulum mass and to the second pendulum mass and extends past the first pendulum mass in a second circumferential direction, opposite the first circumferential direction; a first radial travel stop, included in the plurality of radial travel stops, is located radially outward of the first resilient bumper and is aligned with at least a portion of the first resilient bumper in the radial direction; a second radial travel stop, included in the plurality of radial travel stops, is located radially outward of the second resilient bumper and is aligned with at least a portion of the second resilient bumper; and the first radial travel stop includes a first lip integral to the first pendulum mass or to the second pendulum mass, or the first radial travel stop includes a U-shaped clip fixedly connected at least one of the first pendulum mass or the second pendulum mass.

According to aspects illustrated herein, there is provided a method of operating a centrifugal pendulum, the centrifugal pendulum including a first pendulum mass, a second pendulum mass fixedly connected to the first pendulum mass with a fastener, a center plate axially disposed between the first pendulum mass and the second pendulum mass, a resilient bumper located between the first pendulum mass and the second pendulum mass, disposed around the fastener and extending past the first pendulum mass and the second pendulum mass in a circumferential direction, and a radial travel stop connected to the first pendulum mass or to the second pendulum mass, located radially outward of the resilient bumper and radially aligned with at least a portion of the resilient bumper. The method includes: rotating the center plate at a first speed; displacing, in a circumferential direction or in a radial direction, the first pendulum mass and the second pendulum mass with respect to the center plate; maintaining a gap, in a radial direction, between the resilient bumper and the radial travel stop; rotating the center plate at a second speed, greater than the first speed; expanding the resilient bumper radially outwardly with respect to the fastener; contacting the radial travel stop with the resilient bumper; and blocking, with the radial travel stop, further radially outward expansion of the resilient bumper with respect to the fastener.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
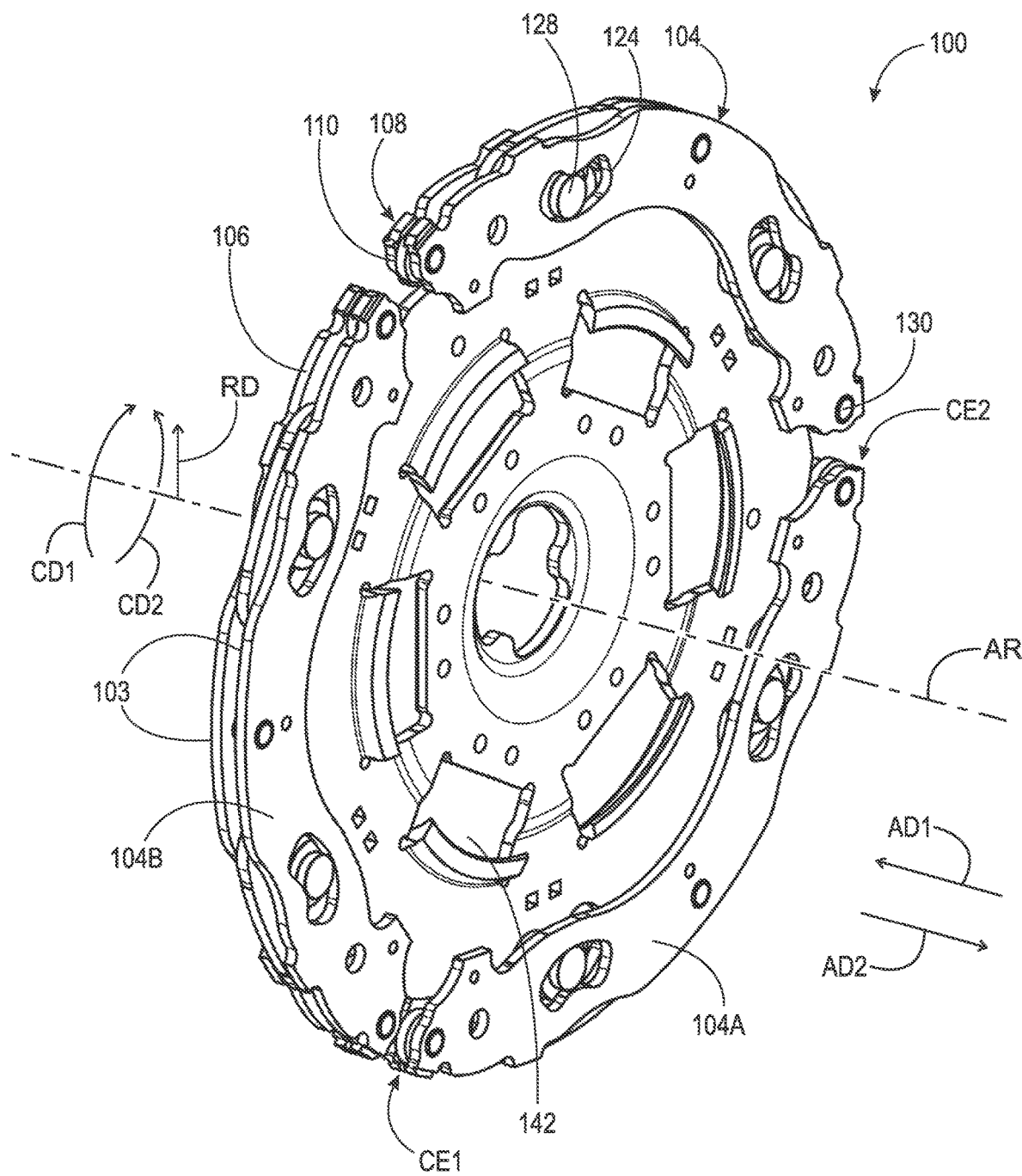
FIG. 1 is a front isometric view of a centrifugal pendulum absorber with a radial travel stop.

FIG. 1 is a front isometric view of centrifugal pendulum absorber 100 with a radial travel stop.

Figure 2:
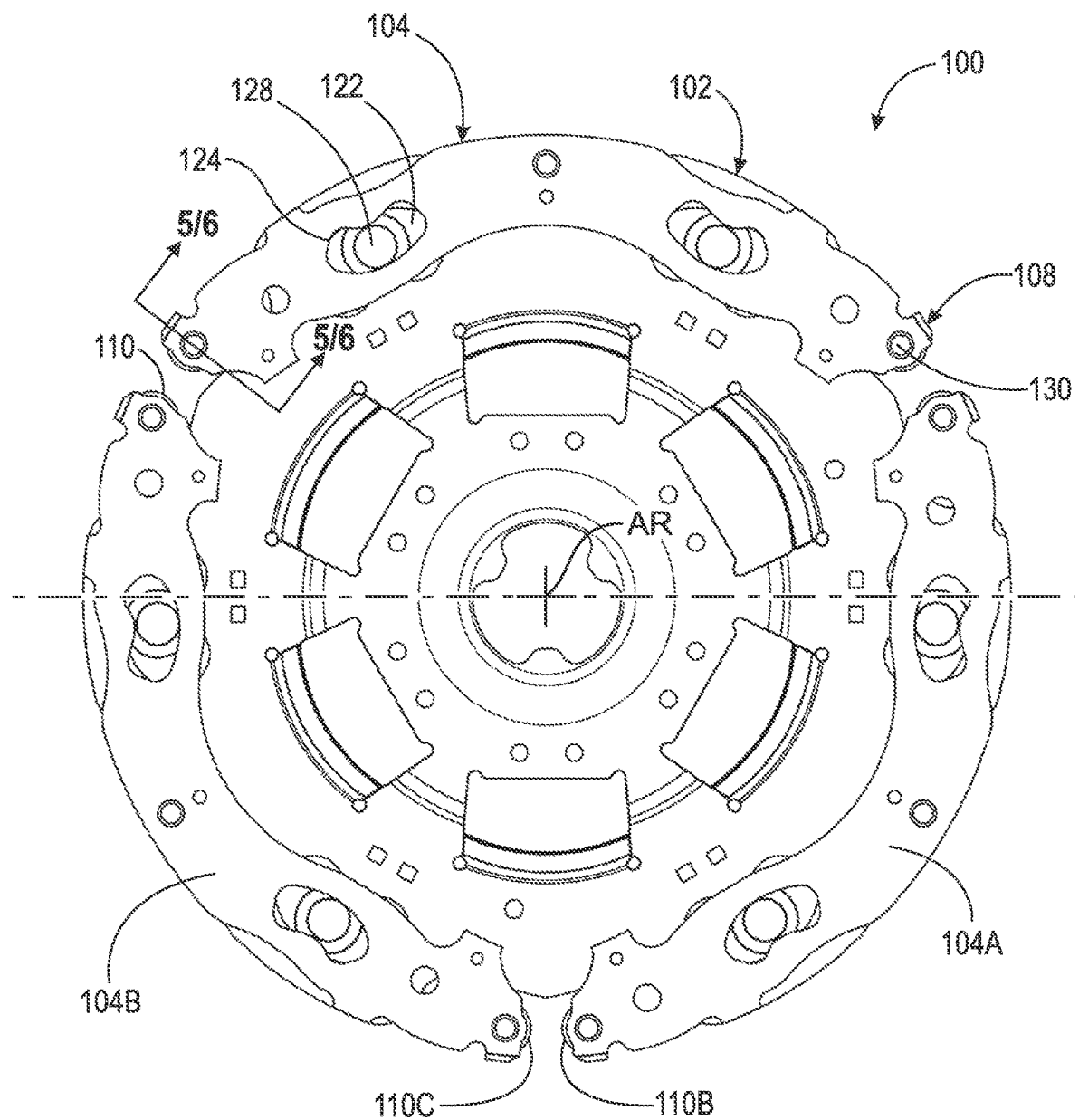
FIG. 2 is a front view of the centrifugal pendulum absorber shown in FIG. 1.

FIG. 2 is a front view of centrifugal pendulum absorber 100 shown in FIG. 1.

Figure 3:
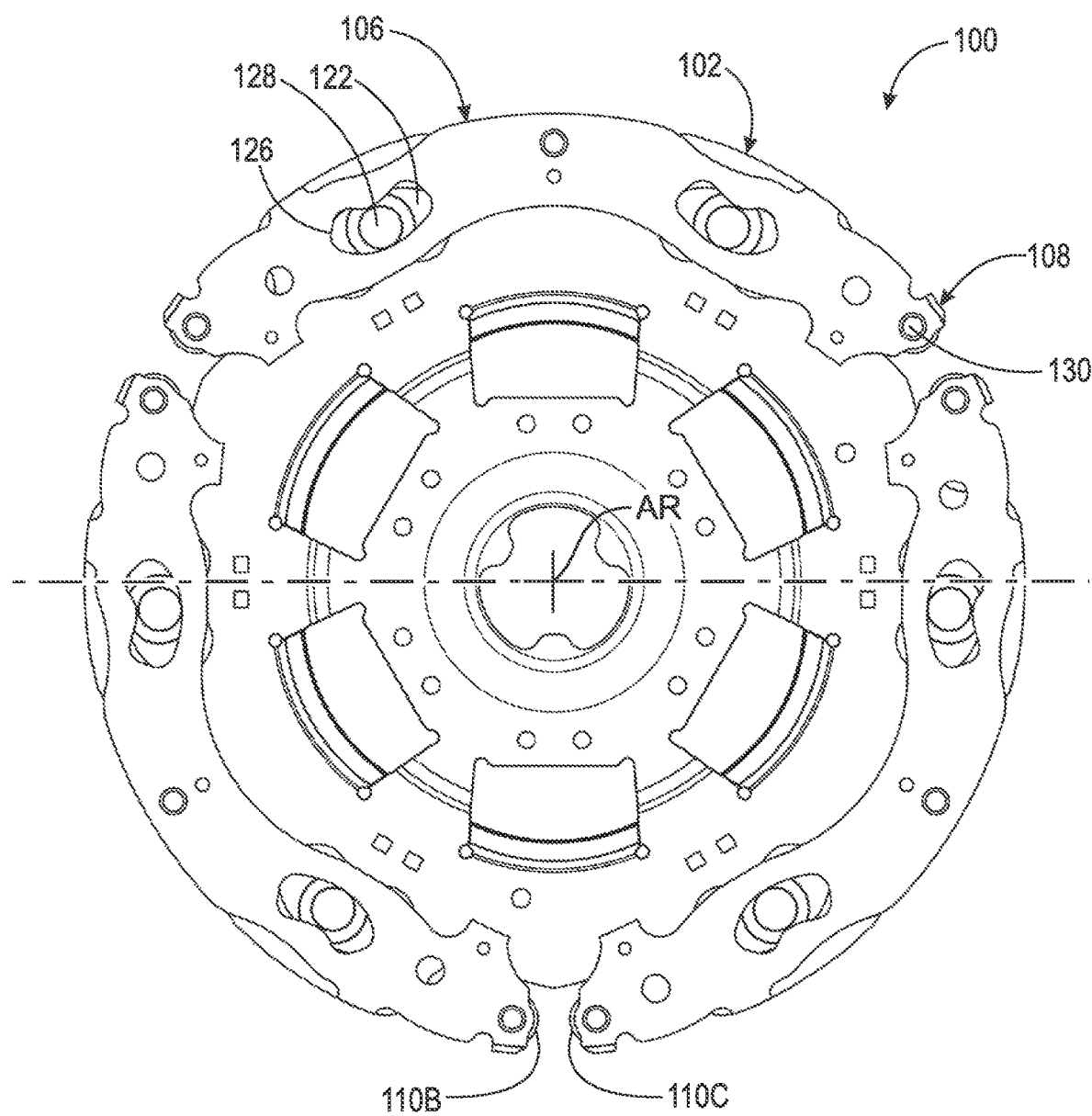
FIG. 3 is a back view of the centrifugal pendulum absorber shown in FIG. 1.

FIG. 3 is a back view of centrifugal pendulum absorber 100 shown in FIG. 1.

Figure 4:
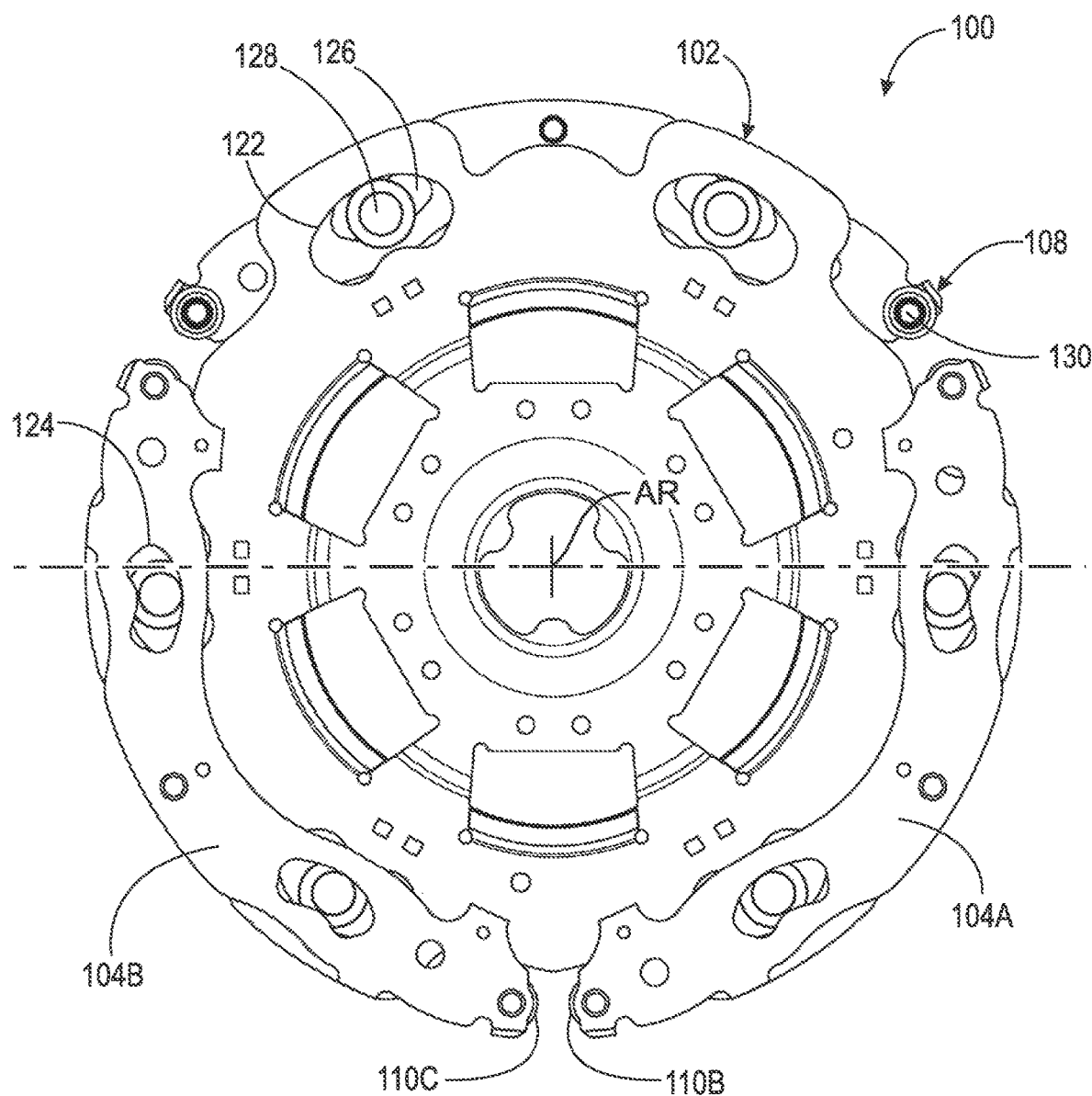
FIG. 4 is a front view of the centrifugal pendulum absorber shown in FIG. 1 with a front pendulum mass removed.

FIG. 4 is a front view of centrifugal pendulum absorber 100 shown in FIG. 1 with a front pendulum mass removed. The following should be viewed in light of FIGS. 1 through 4. Centrifugal pendulum absorber 100 includes: center plate 102; pairs 103 of pendulum masses 104 and pendulum masses 106; radial travel stops 108; and resilient bumpers 110 connected to masses 104 and 106.

Figure 5:
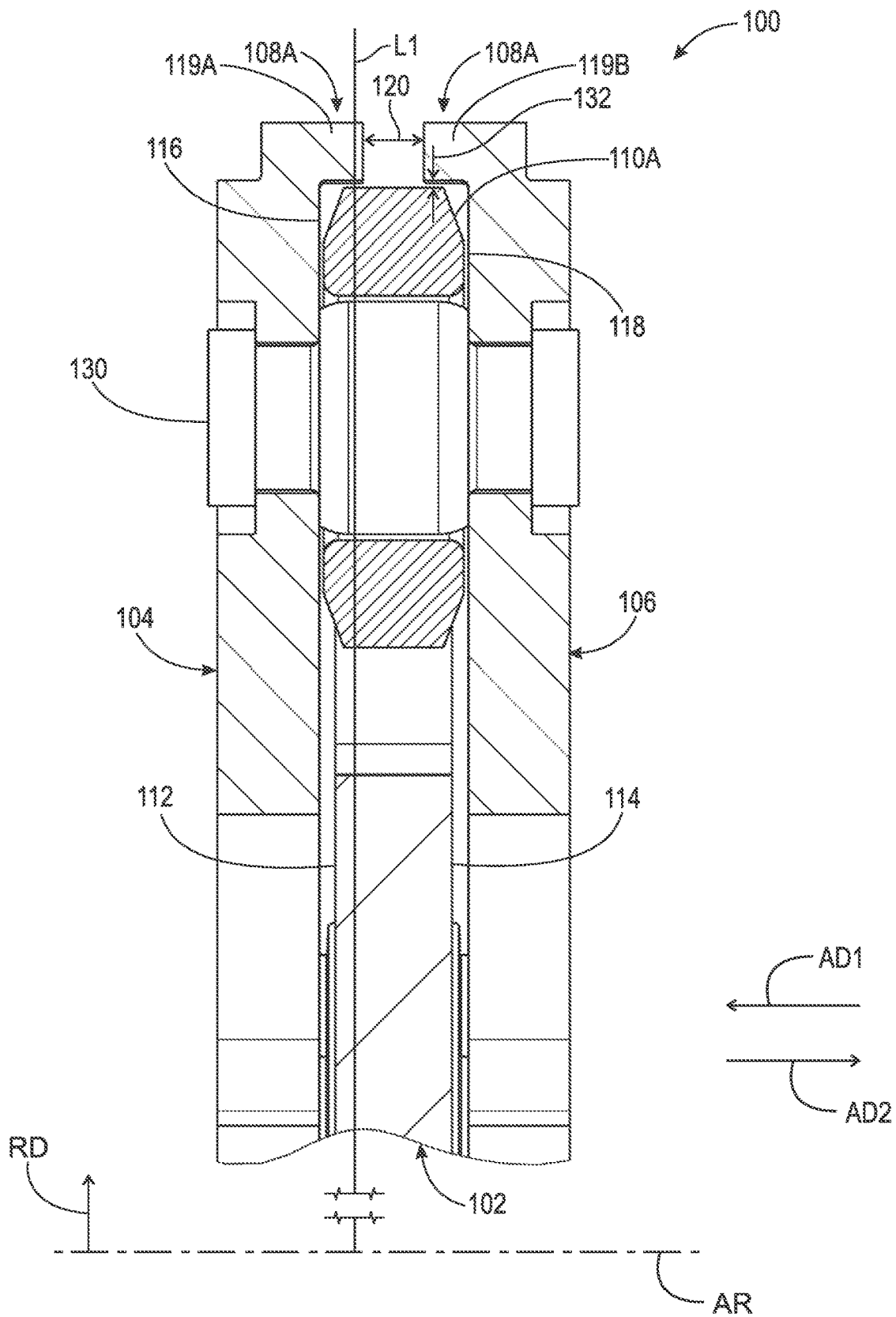
FIG. 5 is a cross-sectional view generally along line 5/6-5/6 in FIG. 2.

FIG. 5 is a cross-sectional view generally along line 5/6-5/6 in FIG. 2.

Figure 6:
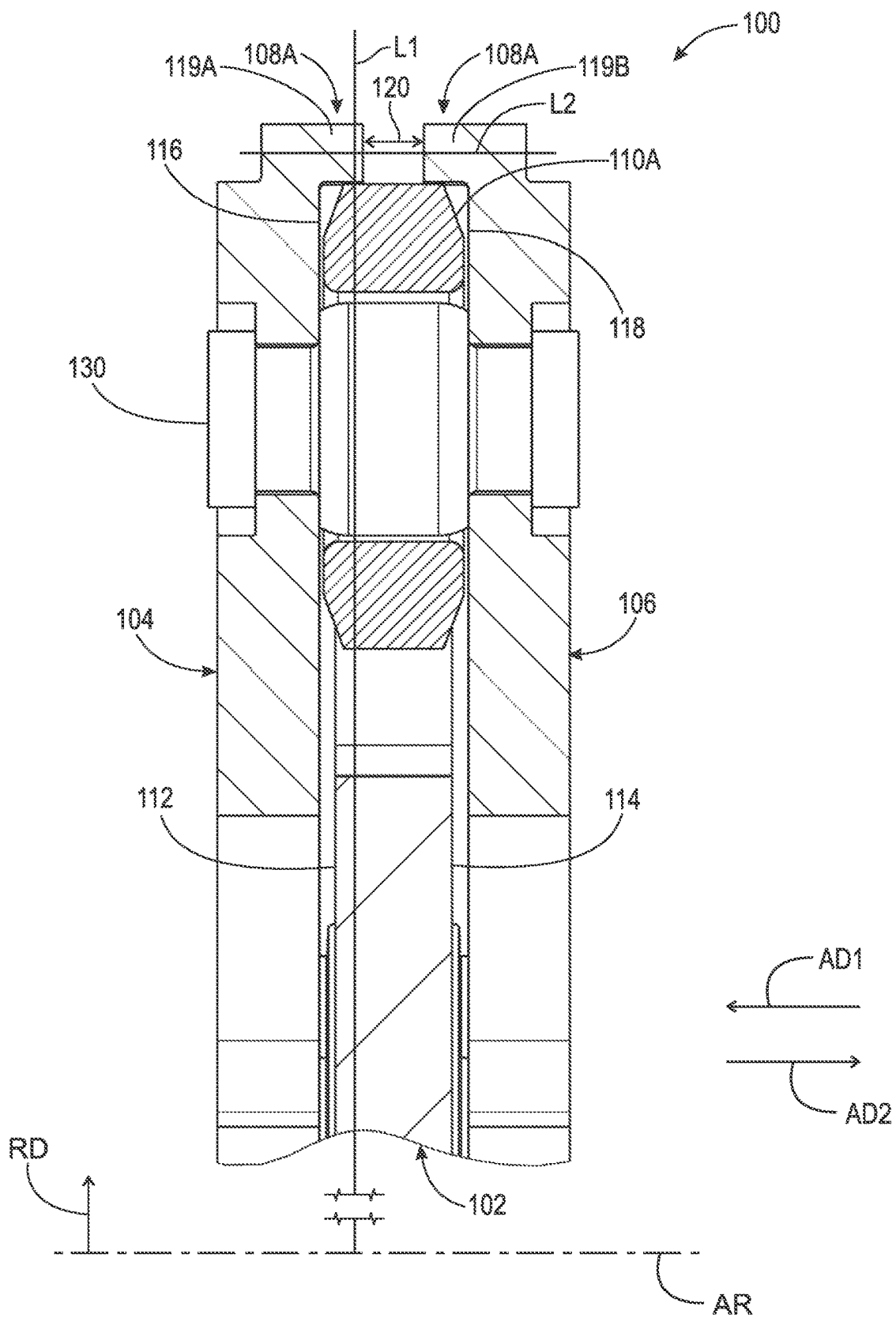
FIG. 6 is a cross-sectional view generally along line 5/6-5/6 in FIG. 2.

FIG. 6 is a cross-sectional view generally along line 5/6-5/6 in FIG. 2. The following should be viewed in light of FIGS. 1 through 6. Center plate 102 includes: side 112 facing in axial direction AD parallel to axis of rotation AR of centrifugal pendulum absorber 100; and side 114 facing in axial direction AD2, opposite direction AD1. Pendulum masses 104 are disposed on side 112 and pendulum masses 106 are disposed on side 114. That is, pairs 103 axially bracket center plate 102.

Radial travel stops 108 are: connected to pendulum masses 104 or pendulum masses 106; located radially outward of resilient bumpers 110; and radially aligned with resilient bumpers 110. By "located radially outward of resilient bumpers 110; and radially aligned with resilient bumpers 110" we mean, for example, straight line L1, orthogonal to axis AR and originating at axis AR, passes through, in sequence, bumper 110A and radial travel stop 108A in radially outer direction RD. In the discussion above and in the discussion that follows, capital letters are used to designate a specific component from a group of components otherwise designated by a three digit number, for example, resilient bumper 110A is a specific example from among resilient bumpers 110.

Each mass 104 includes side 116 facing in direction AD2, and each mass 106 includes side 118 facing in direction AD1. In the example of FIG. 1, each travel stop 108 includes two lips 119. One lip 119 of a pair 103 is integral to mass 104 and extends from side 116 in direction AD2, and the other lip of the pair 103 is integral to mass 106 and extends from side 118 in direction AD1. In the example of FIG. 1, The two lips 119 of the stop 108, for example lips 119A and 119B, are separated by gap 120. In an example embodiment not shown, the two lips 119 of a stop 108 are in contact. In an example embodiment not shown, at least one stop 108 includes only a single lip 119 extending from mass 104 or from mass 106. In an example embodiment not shown, a stop 108 includes at least one lip 119 non-integral to a mass 104 or 106 and fixedly connected to the mass 104 or 106.

Center plate 102 includes openings 122. Each mass 104 includes openings 124. Each mass 106 includes openings 126. Centrifugal pendulum absorber 100 includes rollers 128. Each roller 128 passes through a respective opening 122 and terminates in a respective opening 124 and a respective opening 126. In the example of FIG. 1, absorber 100 includes fasteners 130 non-rotatably connecting pairs 103 of masses 104 and 106. Each bumper 110 is installed and disposed around a respective fastener 130. Each pair 103 includes two bumpers 110. The first of the two bumpers 110 is located proximate circumferential end CE1 of the pair 103 and extends past the pair 103 in circumferential direction CD1. The second of the two bumpers 110 is located proximate circumferential end CE2 of the pair 103 and extends past the pair 103 in circumferential direction CD2, opposite direction CD1.

As is known in the art, in reaction to rotation of center plate 102, the configuration of rollers 128 in openings 122, 1242, and 126, enables radial and circumferential displacement of masses 104 and 106, with respect to center plate 102, to absorb vibration associated with the rotation of center plate 102. At times, the radial and circumferential displacement causes circumferentially adjacent pairs 103 of masses 104 and 106 to displace toward each other. Bumpers 110 prevent direct contact of masses 104 and 106 due to the displacement of masses 104 and 106 toward each other. For example, when masses 104A and 104B are displaced toward each other, bumpers 110B and 110C contact each other to prevent direct contact of masses 104A and 104B.

FIG. 5 is applicable to a condition in which absorber 100 is at rest or is rotating below a threshold speed. Bumpers 110 have not been distorted due to a centrifugal force linked to the rotation of absorber 100. Thus, bumpers 110 are free of contact with stops 108 and are separated from stops 108 by gaps 132 in radial direction RD.

FIG. 6 is applicable to a condition in which absorber 100 is rotating at or above the threshold speed. The centrifugal force linked to the rotation of absorber 100 has caused an outward deflection of bumpers 110, so that bumpers 110 contact stops 108. The contact of bumpers 110 with stops 108 limits further outward deflection of bumpers 110 and prevents strain on and damage to bumpers 110 from excessive outward deflection. Thus, the durability and service life of bumpers 110 are increased. In the example of FIG. 1, the two lips 119 of each stop 108 are axially aligned. For example, straight line L2, parallel to axis AR, passes through lip 119A and lip 119B. In the example of FIG. 1, any line parallel to axis AR and passing through one lip 119 of a pair 103 passes through the other lip 119 of the pair 103.

Figure 7:
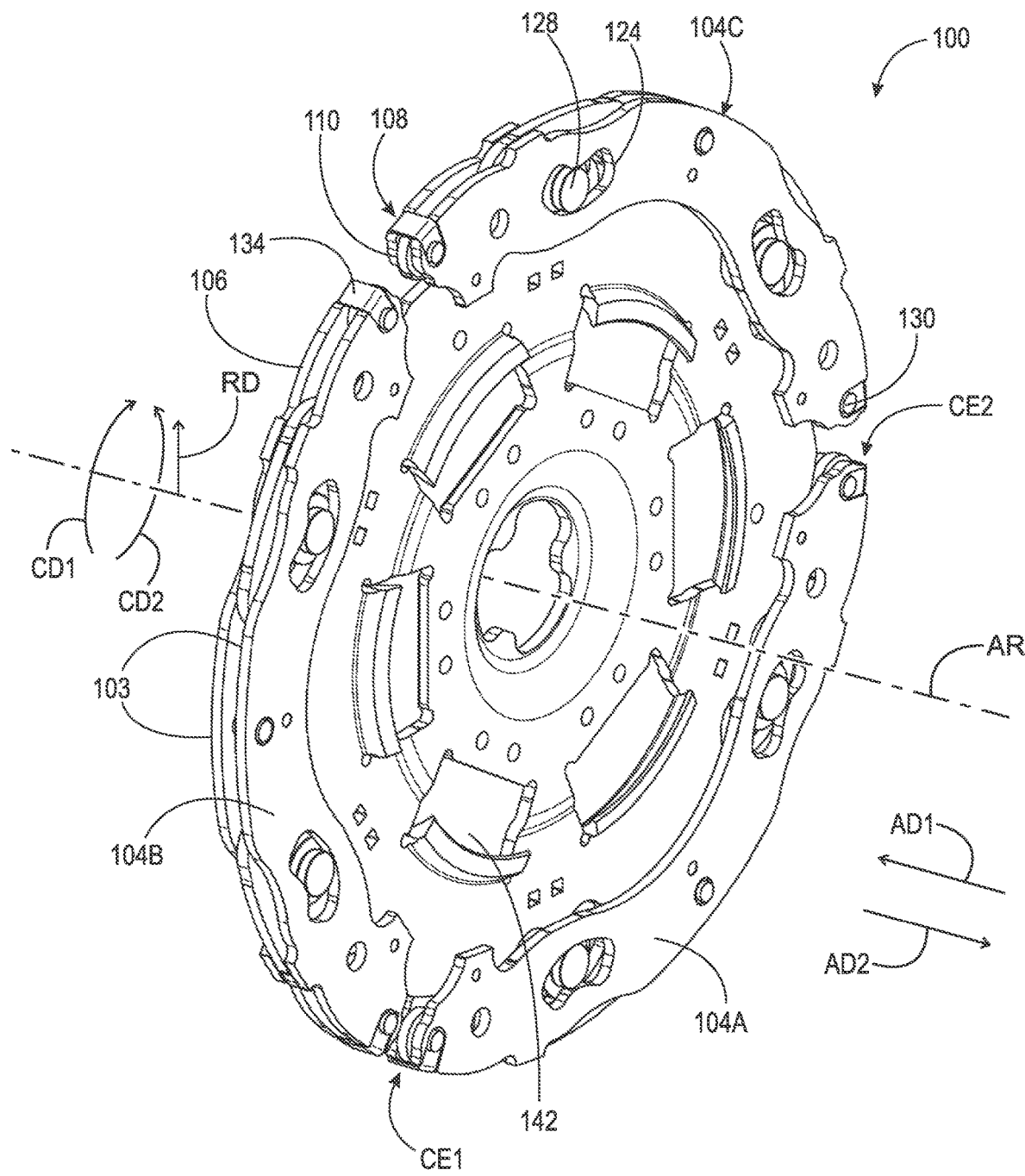
FIG. 7 is a front isometric view of a centrifugal pendulum absorber with a clip radial travel stop.

FIG. 7 is a front isometric view of centrifugal pendulum absorber 100 with a clip radial travel stop.

Figure 8:
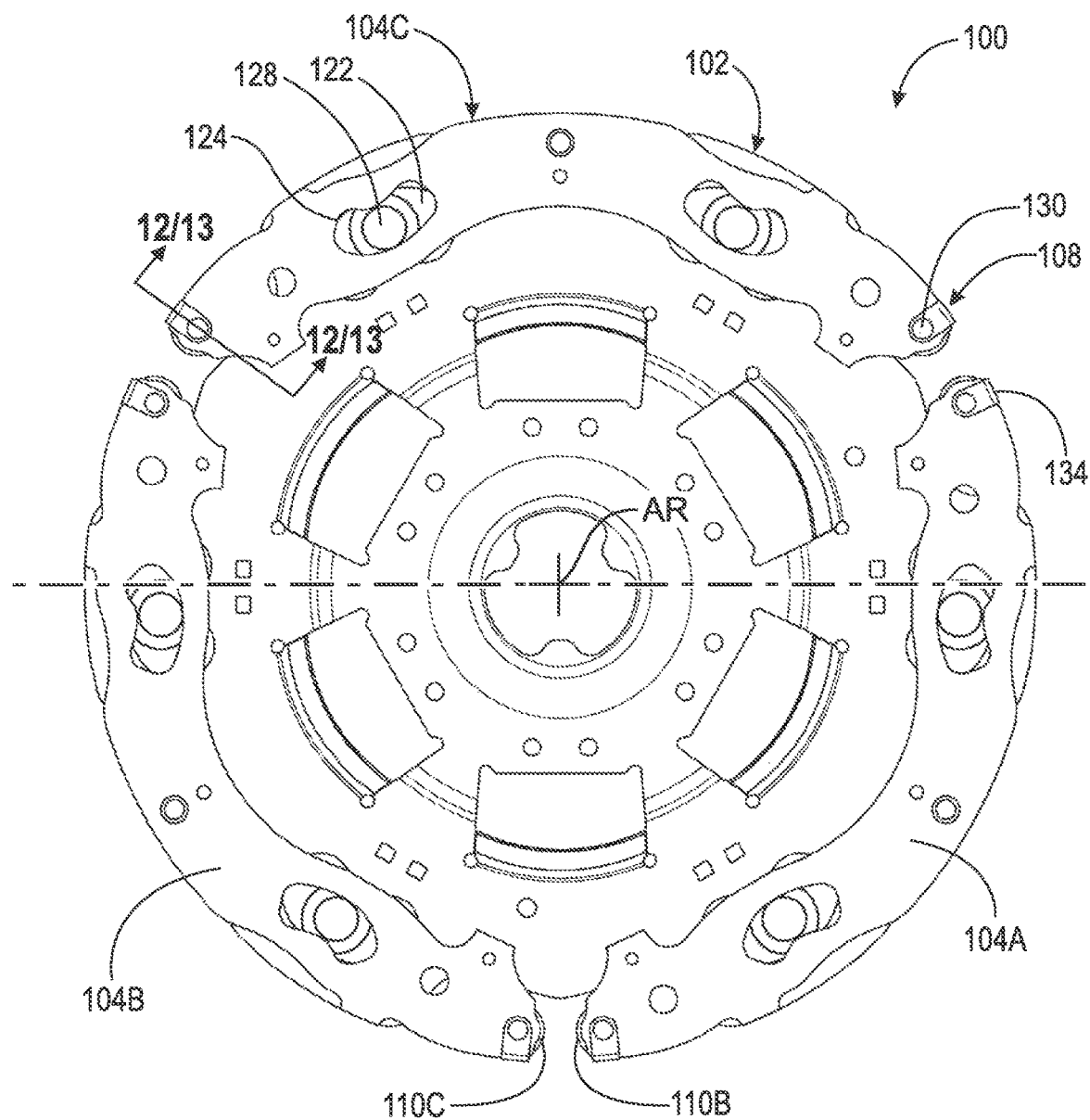
FIG. 8 is a front view of the centrifugal pendulum absorber shown in FIG. 7.

FIG. 8 is a front view of centrifugal pendulum absorber 100 shown in FIG. 7.

Figure 9:
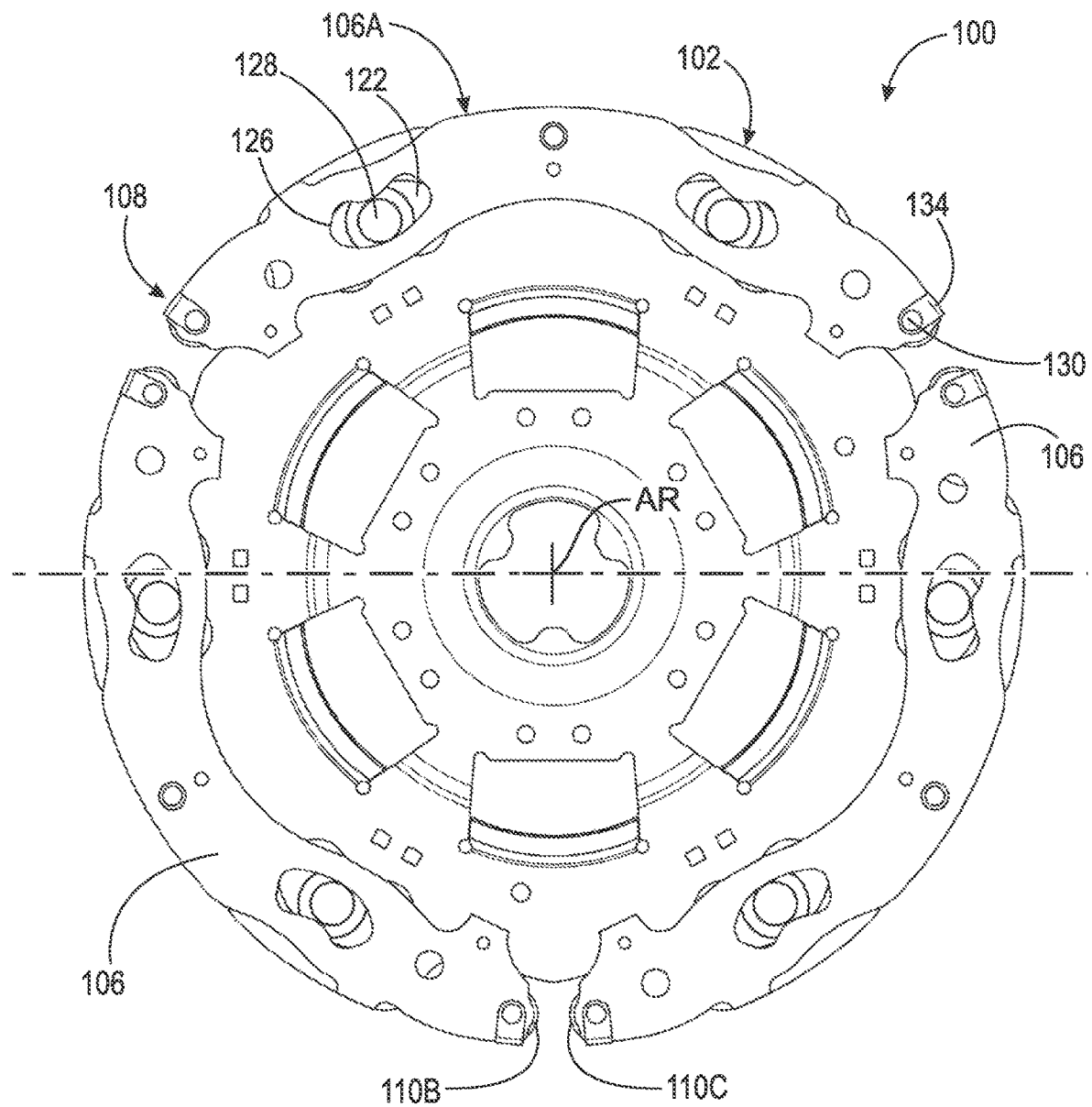
FIG. 9 is a back view of the centrifugal pendulum absorber shown in FIG. 7.

FIG. 9 is a back view of centrifugal pendulum absorber 100 shown in FIG. 7.

Figure 10:
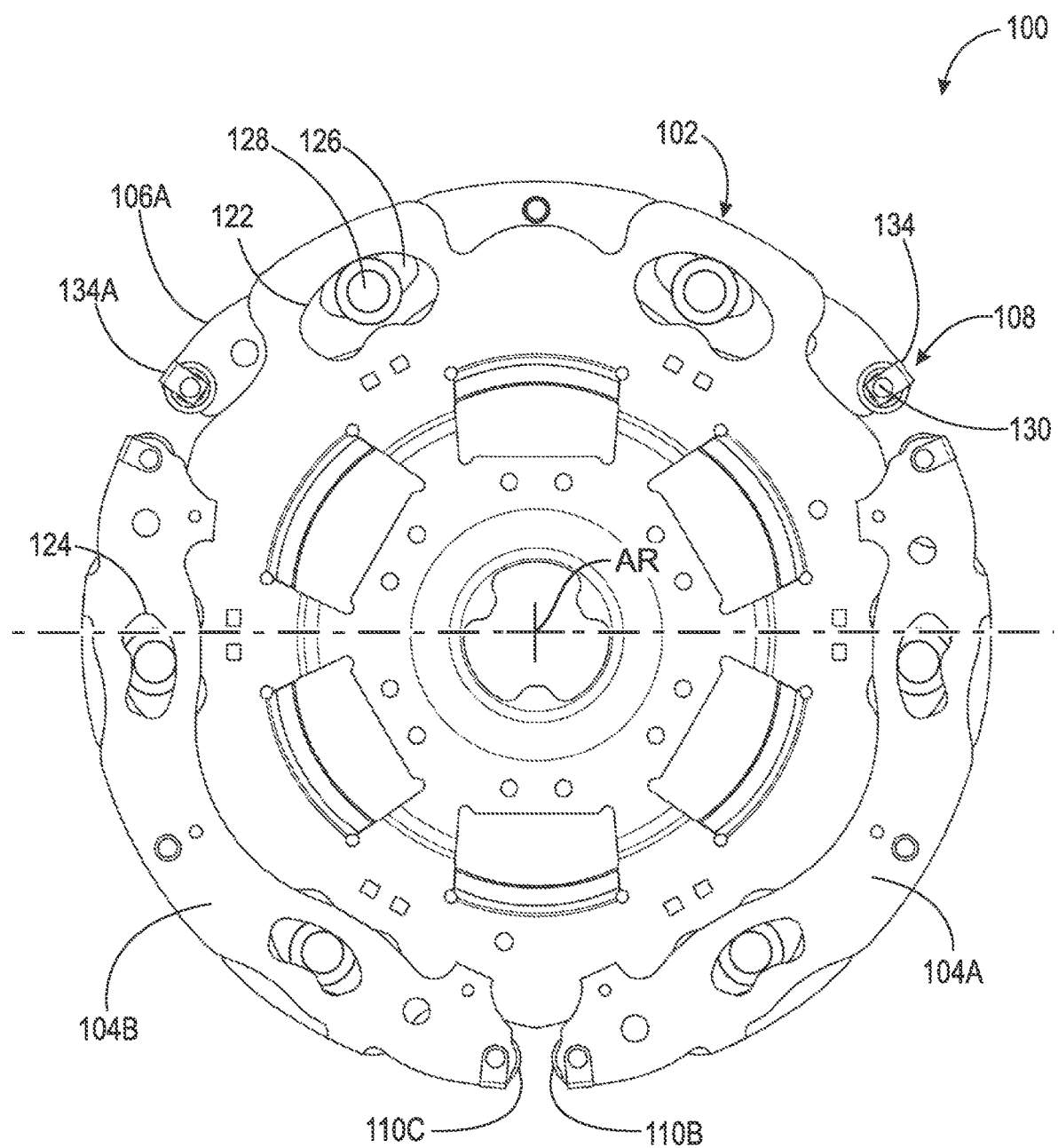
FIG. 10 is a front view of the centrifugal pendulum absorber shown in FIG. 7 with front pendulum masses removed.

FIG. 10 is a front view of the centrifugal pendulum absorber shown in FIG. 7 with a front pendulum mass removed.

Figure 11:
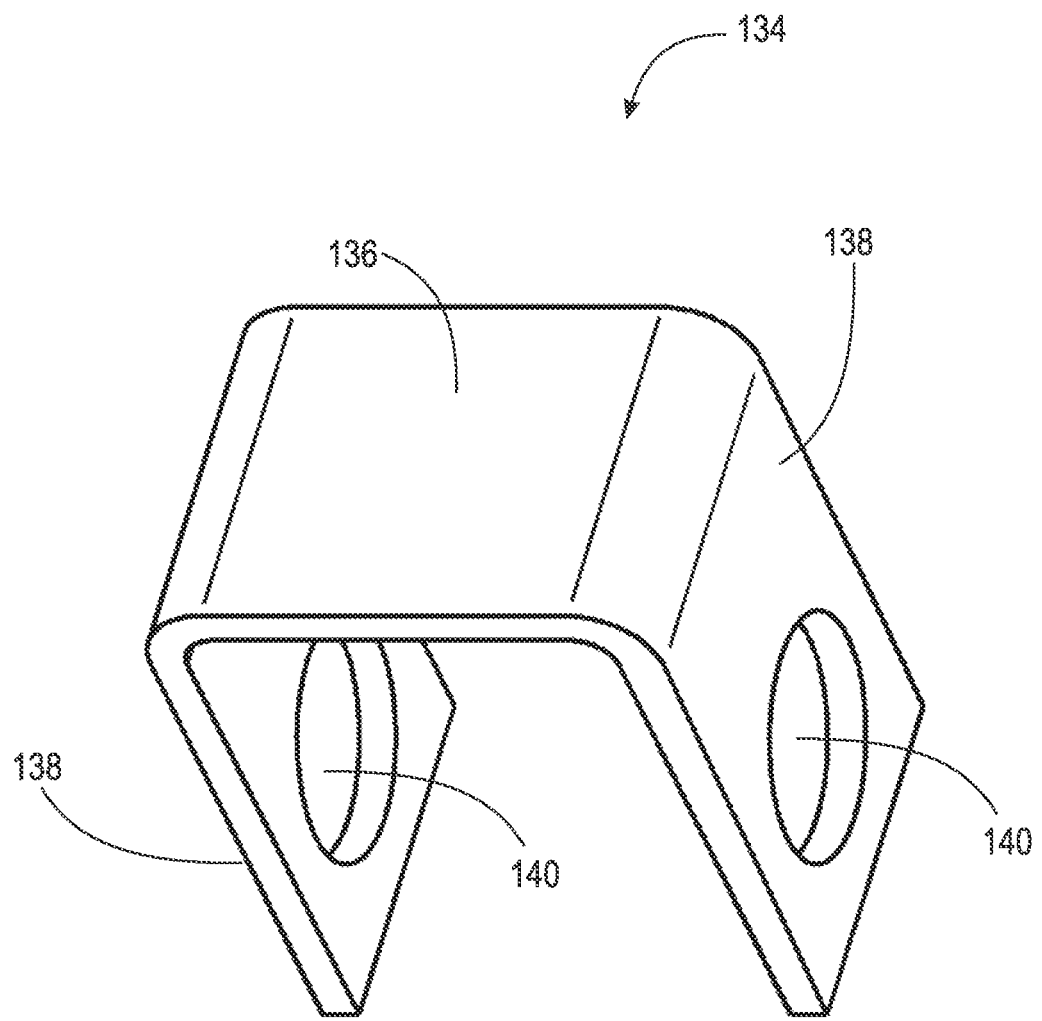
FIG. 11 is an isometric view of a clip shown in FIG. 7.

FIG. 11 is an isometric view of a clip shown in FIG. 7.

Figure 12:
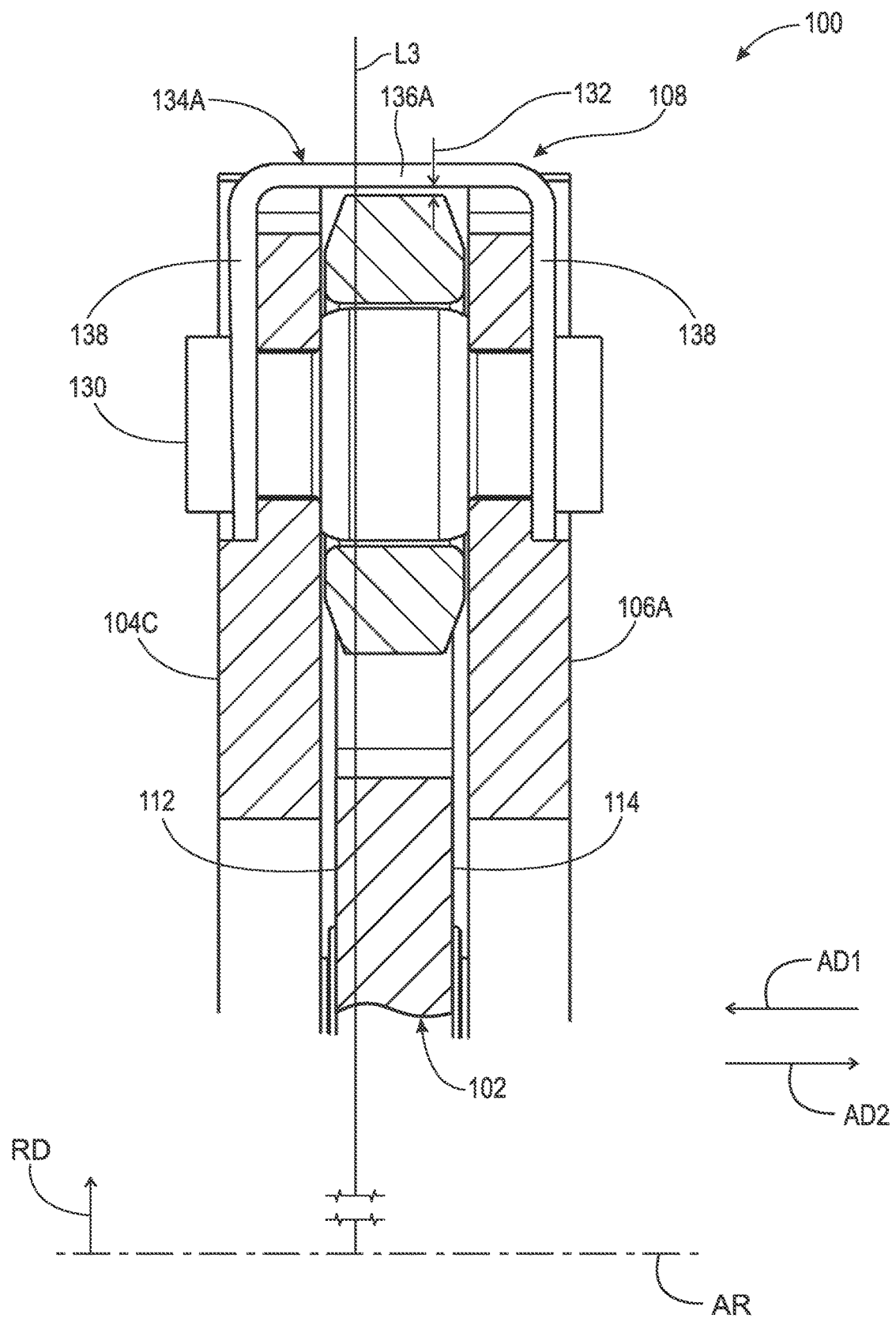
FIG. 12 is a cross-sectional view generally along line 12/13-12/13 in FIG. 8.

FIG. 12 is a cross-sectional view generally along line 12/13-12/13 in FIG. 8.

Figure 13:
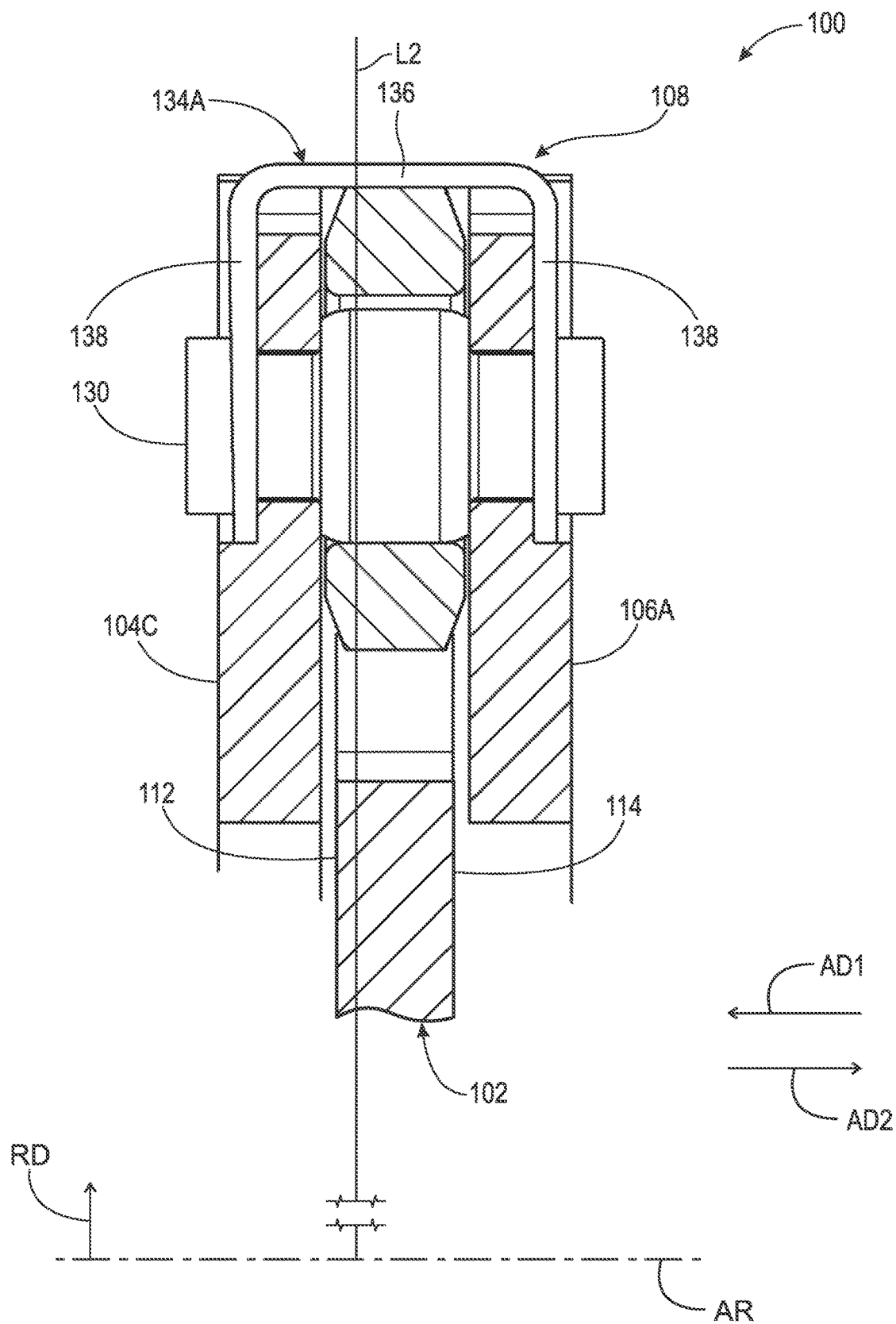
FIG. 13 is a cross-sectional view generally along line 12/13-12/13 in FIG. 8.

FIG. 13 is a cross-sectional view generally along line 12/13-12/13 in FIG. 8. The discussion for centrifugal pendulum absorber 100 shown in FIGS. 1 through 6 is applicable to centrifugal pendulum absorber 100 shown in FIG.

7 except as noted. In the example of FIG. 7, each radial travel stop 108 includes U-shaped clip 134 in place of lips 119. Clips 134: are fixedly connected to a respective pair 103 of masses 104 and 106; include bridge portion 136 located radially outward of resilient bumpers 110; and are radially aligned with resilient bumpers 110. For example, clip 134A is fixedly connected to mass 104C and mass 106A. Straight line L2, orthogonal to axis AR, passes through bumper 110A and portion 136A of clip 134A in radially outer direction RD.

Clips 134 can be fixedly connected by any means known in the art. Clip 134 includes legs 138 connected by bridge portion 136. In the example of FIG. 7, clips 134 include openings 140 and fasteners 130 pass through openings 140 to fixedly connect clips 134 to the respective pairs 103 of masses 104 and 106.

FIG. 12 is applicable to a condition in which absorber 100 is at rest or is rotating below the threshold speed. Bumpers 110 have not been distorted due to a centrifugal force linked to the rotation of absorber 100. Thus, bumpers 110 are free of contact with clips 134, in particular bridge portions 136, and are separated from clips 134 by gaps 132 in radial direction RD.

FIG. 13 is applicable to a condition in which absorber 100 is rotating at or above the threshold speed. The centrifugal force linked to the rotation of absorber 100 has caused an outward deflection and expansion of bumpers 110, so that bumpers 110 contact clips 134, in particular bridge portions 136. The contact of bumpers 110 with clips 134 limits outward deflection and expansion of bumpers 110 and prevents strain on and damage to bumpers 110 from excessive outward deflection and expansion. Thus, the durability and service life of bumpers 110 are increased, contributing to an increase in the durability and service life of centrifugal pendulum absorber 100.

In the example of FIGS. 1 and 7, center plate 102 is a component of a vibration damper and includes windows 142 arranged to receive springs.

The following should be viewed in light of FIGS. 1 through 13. The following describes a method of operating centrifugal pendulum 100, centrifugal pendulum 100 including center plate 102, pendulum mass 104 disposed along axially-facing side 112 of center plate 102, pendulum mass 106 disposed along axially-facing sides 114 of center plate 102 and fixedly connected to pendulum mass 104 with fastener 130, resilient bumper 110 located between pendulum mass 104 and pendulum mass 106, disposed around fastener 130 and extending past pendulum mass 104 and pendulum mass 106 in circumferential direction CD1 or circumferential direction CD2, and radial travel stop 108 connected to pendulum mass 104 or pendulum mass 106, located radially outward of resilient bumper 110 and radially aligned with at least a portion of resilient bumper 110. A first step rotates center plate 102 at a first speed. A second step displaces, in circumferential direction CD1 or circumferential direction CD2 or in radial direction RD, pendulum mass 104 and pendulum mass 106 with respect to center plate 102. A third step maintains gap 132, in radial direction RD, between resilient bumper 110 and radial travel stop 108. A fourth step rotates center plate 102 at a second speed, greater than the first speed. A fifth step expands resilient bumper 110 radially outwardly with respect to fastener 130. A sixth step contacts radial travel stop 108 with resilient bumper 110. A seventh step blocks, with resilient bumper 110, further radial outward expansion of radial travel stop 108.

In an example embodiment: the third step includes maintaining gap 132 between resilient bumper 110 and lip 119 integral to pendulum mass 104 or lip 119 integral to pendulum mass 106; the sixth step includes contacting lip 119 with resilient bumper 110; and the seventh step includes blocking, with lip 119, further radial outward expansion of resilient bumper 110.

In an example embodiment: the third step maintaining gap 132 between the resilient bumper 110 and U-shaped clip 134 connected to pendulum mass 104 and to pendulum mass 106; the sixth step includes contacting U-shaped clip 134 with resilient bumper 110; and the seventh step includes blocking, with U-shaped clip 134, further radial outward expansion of resilient bumper 110.

As noted above, the centrifugal force linked to the rotation of absorber 100 at or above the threshold speed causes an outward deflection and expansion of bumpers 110, so that bumpers 110 contact lips 119, or clips 134. The contact of bumpers 110 with lips 119 or clips 134 limits radially outward deflection and expansion of bumpers 110 and prevents strain on and damage to bumpers 110 from excessive radially outward deflection and expansion. Thus, the durability and service life of bumpers 110 are increased, contributing to an increase in the durability and service life of centrifugal pendulum absorber 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
CE1 circumferential end
CE2 circumferential end
L1 straight line
L2 straight line
L3 straight line
RD radially outer direction
100 centrifugal pendulum absorber
102 center plate
103 pair of pendulum masses
104 pendulum mass
104A pendulum mass
104B pendulum mass
104C pendulum mass
106 pendulum mass
106A pendulum mass
108 radial travel stop
108A radial travel stop
110 resilient bumper
110A resilient bumper
110B resilient bumper
110C resilient bumper
112 side, center plate
114 side, center plate
116 side, mass 104
118 side, mass 106
119 lip
120 gap 122 opening, center plate
124 opening, mass 104
126 opening, mass 106
128 roller
130 fastener
132 gap
134 clip
134A clip
136 bridge portion, dip
136A bridge portion
138 leg, clip
140 opening, clip
142 window

The invention claimed is:

1. A centrifugal pendulum absorber, comprising:
   a first pendulum mass;
   a second pendulum mass;
   a center plate:
   axially located between the first pendulum mass and the second pendulum mass;
   connected to the first pendulum mass and the second pendulum mass; and,
   arranged to receive rotational torque;
   a first resilient bumper:
   axially located between the first pendulum mass and the second pendulum mass; and,
   connected to the first pendulum mass and the second pendulum mass; and,
   a first radial travel stop:
   connected to the first pendulum mass or to the second pendulum mass;
   located radially outward of the first resilient bumper;
   radially aligned with at least a portion of the first resilient bumper; and,
   free of contact with the first resilient bumper when the centrifugal pendulum absorber is at rest.

2. The centrifugal pendulum absorber of claim 1, wherein:
   the first radial travel stop is connected to the first pendulum mass and includes a lip integral to the first pendulum mass; or,
   the first radial travel stop is connected to the second pendulum mass and includes a lip integral to the second pendulum mass.

3. The centrifugal pendulum absorber of claim 1, wherein:
   a first radial travel stop is connected to the first pendulum mass and to the second pendulum mass;
   the first radial travel stop includes a first lip integral to the first pendulum mass; and,
   the first radial travel stop includes a second lip integral to the second pendulum mass.

4. The centrifugal pendulum absorber of claim 1, wherein:
   the first radial travel stop is connected to the first pendulum mass and includes a lip integral to the first pendulum mass and extending toward the second pendulum mass in an axial direction parallel to an axis of rotation of the centrifugal pendulum absorber; or,
   the first radial travel stop is connected to the second pendulum mass and includes a lip integral to the second pendulum mass and extending toward the first pendulum mass in an axial direction parallel to an axis of rotation of the centrifugal pendulum absorber.

5. The centrifugal pendulum absorber of claim 1, wherein the first radial travel stop includes a U-shaped clip fixedly connected to at least one of the first pendulum mass or the second pendulum mass.

6. The centrifugal pendulum absorber of claim 1, wherein the first radial travel stop includes a U-shaped clip fixedly connected to the first pendulum mass and to the second pendulum mass.

7. The centrifugal pendulum absorber of claim 6, wherein a bridge portion of the U-shaped clip is located radially outward of the first pendulum mass and the second pendulum mass.

8. The centrifugal pendulum absorber of claim 1, further comprising:
   a fastener fixedly connecting the first pendulum mass to the second pendulum mass, wherein:
   the first resilient bumper is disposed around the fastener;
   when the center plate is free of rotation, the first resilient bumper is free of contact with the first radial travel stop; and,
   when the center plate rotates beyond a threshold rotation speed, the first resilient bumper is arranged to expand radially outwardly with respect to the fastener and contact the first radial travel stop.

9. The centrifugal pendulum absorber of claim 1, further comprising:
   a plurality of rollers, wherein
   the center plate includes a first plurality of openings;
   the first pendulum mass includes a second plurality of openings;
   the second pendulum mass includes a third plurality of openings;
   the plurality of rollers passes through the first plurality of openings and terminates in the second plurality of openings and in the third plurality of openings; and,
   the plurality of rollers enables displacement of the first pendulum mass and the second pendulum mass with respect to the center plate.

10. The centrifugal pendulum absorber of claim 1, wherein the center plate includes a first plurality of openings, the centrifugal pendulum absorber further comprising:
    a third pendulum mass circumferentially adjacent to the first pendulum mass and including a second plurality of openings;
    a fourth pendulum mass circumferentially adjacent to the second pendulum mass and including a third plurality of openings;
    a fastener connecting the third pendulum mass to the fourth pendulum mass;
    a second resilient bumper installed around the fastener;
    a second radial travel stop:
    fixedly connected to the third pendulum mass or to the fourth pendulum mass;
    located radially outward of the second resilient bumper; and,
    radially aligned with the second resilient bumper; and,
    a plurality of rollers passing through the first plurality of openings and terminating in the second plurality of openings and in the third plurality of openings.

11. The centrifugal pendulum absorber of claim 10, wherein:
    the second radial travel stop is connected to the first pendulum mass and includes a lip integral to the first pendulum mass; or,
    the second radial travel stop is connected to the second pendulum mass and includes a lip integral to the second pendulum mass.

12. The centrifugal pendulum absorber of claim 10, wherein the second radial travel stop includes a U-shaped clip fixedly connected to the third pendulum mass and to the fourth pendulum mass.

13. The centrifugal pendulum absorber of claim 10, further comprising:
a fastener fixedly connecting the first pendulum mass to the second pendulum mass, wherein:
the second resilient bumper is installed around the fastener;
when the center plate is free of rotation, the second resilient bumper is free of contact with the first radial travel stop; and,
when the center plate rotates beyond a threshold rotation speed, the second resilient bumper is arranged to expand radially outwardly with respect to the fastener and contact the first radial travel stop.

14. The centrifugal pendulum absorber of claim 1, further comprising:
a second resilient bumper located between the first pendulum mass and the second pendulum mass and connected to the first pendulum mass and the second pendulum mass; and,
a second radial travel stop:
connected to the first pendulum mass or the second pendulum mass;
located radially outward of the second resilient bumper; and,
radially aligned with the second resilient bumper.

15. A centrifugal pendulum absorber, comprising:
a center plate arranged to receive rotational torque and including a first plurality of openings;
a plurality of pairs of pendulum masses, each pair of pendulum masses including a first pendulum mass and a second pendulum mass axially bracketing the center plate, the first pendulum mass including a second plurality of openings, and the second pendulum mass including a third plurality of openings;
a plurality of rollers:
located in the first plurality of openings, the second plurality of openings, and the third plurality of openings; and,
enabling relative displacement between the plurality of pairs of pendulum masses and the center plate in a first circumferential direction and in a radial direction;
a plurality of resilient bumpers; and,
a plurality of radial travel stops connected to the plurality of pairs of pendulum masses, wherein for each pair of pendulum masses:
a first resilient bumper, included in the plurality of resilient bumpers, is connected to the first pendulum mass and to the second pendulum mass and extends past the first pendulum mass in the first circumferential direction;
a second resilient bumper, included in the plurality of resilient bumpers, is connected to the first pendulum mass and to the second pendulum mass and extends past the first pendulum mass in a second circumferential direction, opposite the first circumferential direction;
a first radial travel stop, included in the plurality of radial travel stops, is located radially outward of the first resilient bumper, and is aligned with at least a portion of the first resilient bumper in the radial direction;
a second radial travel stop, included in the plurality of radial travel stops, is located radially outward of the second resilient bumper, and is aligned with at least a portion of the second resilient bumper; and,
the first radial travel stop includes a first lip integral to the first pendulum mass or to the second pendulum mass; or,
the first radial travel stop includes a U-shaped clip fixedly connected at least one of the first pendulum mass or the second pendulum mass.

16. The centrifugal pendulum absorber of claim 15, further comprising:
a plurality of fasteners fixedly connecting the first pendulum masses to the second pendulum masses, wherein:
each resilient bumper, included in the plurality of resilient bumpers, is installed around a respective fastener included in the plurality of fasteners;
when the center plate is free of rotation, the plurality of resilient bumpers is free of contact with the plurality of resilient bumpers; and,
when the center plate rotates beyond a threshold rotation speed, the plurality of resilient bumpers is arranged to expand radially outwardly with respect to the plurality of fasteners and contact the plurality of radial travel stops.

17. The centrifugal pendulum absorber of claim 15, wherein the first radial travel stop includes the U-shaped clip fixedly connected to the first pendulum mass and to the second pendulum mass.

18. A method of operating a centrifugal pendulum, the centrifugal pendulum including a first pendulum mass, a second pendulum mass fixedly connected to the first pendulum mass with a fastener, a center plate axially disposed between the first pendulum mass and the second pendulum mass, a resilient bumper located between the first pendulum mass and the second pendulum mass, disposed around the fastener and extending past the first pendulum mass and the second pendulum mass in a circumferential direction, and a radial travel stop connected to the first pendulum mass or to the second pendulum mass, located radially outward of the resilient bumper and radially aligned with at least a portion of the resilient bumper, the method comprising:
rotating the center plate at a first speed;
displacing, in a circumferential direction or in a radial direction, the first pendulum mass and the second pendulum mass with respect to the center plate;
maintaining a gap, in a radial direction, between the resilient bumper and the radial travel stop;
rotating the center plate at a second speed, greater than the first speed;
expanding the resilient bumper radially outwardly with respect to the fastener;
contacting the radial travel stop with the resilient bumper; and,
blocking, with the radial travel stop, further radially outward expansion of the resilient bumper with respect to the fastener.

19. The method of claim 18, wherein:
maintaining the gap, in the radial direction, between the resilient bumper and the radial travel stop includes maintaining the gap between the resilient bumper and a lip integral to the first pendulum mass;
contacting the radial travel stop with the resilient bumper includes contacting the lip with the resilient bumper; and, blocking further expansion of the resilient bumper radially outwardly including blocking further expansion with the lip.

20. The method of claim 18, wherein:

maintaining the gap, in the radial direction, between the resilient bumper and the radial travel stop includes maintaining the gap between the resilient bumper and a U-shaped clip connected to the first pendulum mass and to the second pendulum mass;

contacting the radial travel stop with the resilient bumper includes contacting U-shaped clip with the resilient bumper; and, blocking further expansion of the resilient bumper radially outwardly including blocking further expansion with the U-shaped clip.

\* \* \* \* \*